(12) United States Patent
Fernandez (10) Patent No.: US 7,950,586 B2
(45) Date of Patent: May 31, 2011

(54) SIM CARD HANDLE

(75) Inventor: Alfredo Fernandez, Madrid (ES)

(73) Assignee: SanDisk IL Ltd., Kfar Saba (IL)

( * ) Notice: Subject to any disclaimer, the term of this patent is extended or adjusted under 35 U.S.C. 154(b) by 245 days.

(21) Appl. No.: 11/837,525

(22) Filed: Aug. 12, 2007

(65) Prior Publication Data

US 2008/0316717 A1    Dec. 25, 2008

Related U.S. Application Data

(60) Provisional application No. 60/862,986, filed on Oct. 26, 2006.

(51) Int. Cl.
*G06K 19/06* (2006.01)

(52) U.S. Cl. ........ 235/492; 235/487; 361/725; 361/727; 361/737

(58) Field of Classification Search .................. 235/492, 235/487; 361/725, 727, 737
See application file for complete search history.

(56) References Cited

U.S. PATENT DOCUMENTS

| | | | | |
|---|---|---|---|---|
| 5,061,845 | A * | 10/1991 | Pinnavaia | 235/492 |
| 5,353,328 | A | 10/1994 | Jokimies | |
| 5,500,518 | A * | 3/1996 | Olzak et al. | 235/492 |
| 6,259,418 | B1 * | 7/2001 | Jones et al. | 343/846 |
| 6,266,017 | B1 * | 7/2001 | Aldous | 343/702 |
| 6,461,193 | B1 | 10/2002 | Matthies | |
| 7,053,471 | B2 * | 5/2006 | Wada et al. | 257/679 |
| 7,220,615 | B2 * | 5/2007 | Bolken | 438/106 |
| 7,235,423 | B1 * | 6/2007 | Wang et al. | 438/107 |
| 7,264,495 | B2 | 9/2007 | Zuo et al. | |
| 7,291,903 | B2 * | 11/2007 | Nishizawa et al. | 257/679 |
| 7,364,439 | B2 | 4/2008 | Lin | |
| 2002/0022460 | A1 * | 2/2002 | Lintern et al. | 455/97 |
| 2005/0148217 | A1 * | 7/2005 | Takiar et al. | 439/76.1 |
| 2005/0198424 | A1 * | 9/2005 | Harari et al. | 710/301 |
| 2006/0000899 | A1 * | 1/2006 | Bonalle et al. | 235/380 |
| 2008/0316717 | A1 | 12/2008 | Fernandez | |

FOREIGN PATENT DOCUMENTS

| | | |
|---|---|---|
| EP | 0845753 | 6/1998 |
| WO | 99/34323 | 7/1999 |

OTHER PUBLICATIONS

Office Action dated Feb. 23, 2010 in U.S. Appl. No. 11/837,526.

* cited by examiner

*Primary Examiner* — Daniel A Hess
*Assistant Examiner* — Ali Sharifzada
(74) *Attorney, Agent, or Firm* — Vierra Magen Marcus & DeNiro LLP (57) ABSTRACT

An improved smart card is provided, which is adapted for easy extraction from a smart card socket, or example, in a mobile telephone. Facilitating the easy extraction is a structural deviation in the plane of at least one of the sides of the smart card to enable an increase of an external force on the smart card to thereby cause the extraction of the smart card from a socket. The structural deviation may be a change in the thickness of the smart card or a roughened surface in the smart card's enclosure. The smart card may be a SIM card. Also provided is a method of extracting a smart card from a socket, which method may include the steps of engaging a structural deviation in the plane of at least one side of the smart card's enclosure and applying a force to the engaged structural deviation.

33 Claims, 5 Drawing Sheets

SIM CARD HANDLE

RELATED APPLICATIONS

This application claims priority under 35 U.S.C. §119(e) to U.S. Provisional Application No. 60/862,986, filed Oct. 26, 2006, which is hereby incorporated by reference in its entirety.

This application is related to U.S. patent application Ser. No. 11/837,526 of the same inventor, which is entitled "A METHOD OF EXTRACTING A SMART CARD FROM A SMART CARD SOCKET" and filed on the same day as the present application. U.S. patent application Ser. No. 11/837, 526, also claiming priority to U.S. Provisional Application No. 60/862,986, is incorporated in its entirety as if fully set forth herein.

BACKGROUND

A smart card is a relatively small (typically pocket-sized) card with an embedded integrated circuit (IC) that includes a digital storage array (a memory) and a processor. A smart card typically is used for storing data securely. In the context of mobile phone technology, data used for uniquely identifying a mobile phone subscriber to an associated Mobile Network Operator (MNO) is commonly secured (encrypted). The data stored in a smart card, which may be a Subscriber Identity Module (SIM) card, also defines to which types of services a subscriber is entitled. A SIM card is a special kind of smart card that is used with the Global System for Mobile Communications (GSM) technology.

Because of the small size of mobile telephones and SIM cards, extraction of a SIM card from a mobile phone can be difficult. In part, this is due to the SIM card socket design not being so conducive to the occasional need to extract SIM cards from mobile telephones. Also adding to the difficulty is that the surface of a SIM card is usually smooth and slippery.

Some mobile telephone models, for example, NEC 341i and Nokia 6680, include a SIM card socket that facilitates extraction of SIM cards. However, in other mobile telephone models, for example, SAGEM my700x, Sony Ericsson K600i, and Nokia 7260, extracting a SIM card from a socket is not as easy. Some of the SIM card sockets that facilitate extraction of SIM cards include moving parts, which render them more expensive. If a mobile telephone has a SIM card socket with moving parts, extra space must be dedicated to allow the moving parts to freely move inside the mobile telephone.

Figure 1:
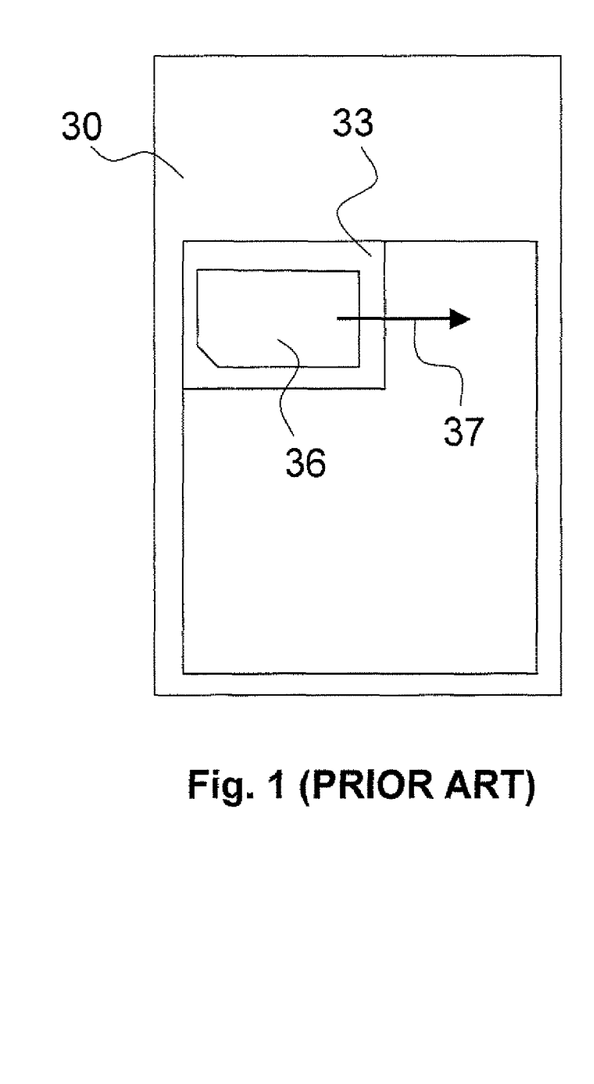
FIG. 1 schematically illustrates a prior art SIM card residing within a mobile phone.

To make many types of mobile telephones operational, a SIM card with proper data must be plugged into a designated socket. FIG. 1 illustrates a mobile telephone 30 with a socket 33 having a conventional SIM card 36 inserted therein. The user of mobile telephone 30 may want to remove or extract SIM card 36 from SIM card socket 33 for various reasons, such as to transfer the SIM card to another mobile telephone or to switch a SIM card when s/he travels to another country serviced by a different MNO.

To extract SIM card 36, the user typically has to press down the SIM card surface and apply a substantially shearing force in a direction parallel to the card surface in an extracting direction 37. However, many conventional SIM cards have smooth or slippery surfaces, so it is difficult to extract them from their sockets. Thus, a need exists for modifying prior art SIM cards to facilitate their extraction from mobile telephones that do not have the more expensive and larger sockets with moving extraction mechanisms.

The present disclosure uses the terms "structural deviation", "SIM card" and "appendage". In the context of the present disclosure these terms are understood as follows:

The term "structural deviation" references a deviation in the plane of at least one of the (traditionally flat and smooth) sides of the enclosure of a smart card or SIM card. A structural deviation may have different roughness and other physical characteristics, as exemplified below, to make the structural deviation engageable by an appendage to enable the extraction of a smart card or SIM card from a socket or from a mobile telephone.

The term "structural deviation" in the context of the present disclosure does not reference deviations that may have been unintentionally formed in the smart card or SIM card, nor does the term reference the "notch" in the card's otherwise rectangular shape that effectively removes a corner of the rectangle.

Regarding the term "SIM card," in addition to the ordinary meaning in the technical field to which the invention generally pertains, the term also references high-capacity storage SIM cards and smart cards that resemble or function like a SIM card. SIM cards typically have the form factor of ID-000 format. However, the present invention can be generalized to other form factors.

The term "appendage" references any object that can engage a structural deviation. Exemplary appendages include pencils, pens, fingers and fingernails.

SUMMARY

The following embodiments and aspects thereof are described and illustrated in conjunction with systems, tools, and methods, which are meant to be exemplary and illustrative but not limiting in scope.

In one embodiment of the invention, an improved multiple-sided SIM card is provided, which may be plugged into and more easily extracted from a SIM card socket, such as a socket of a mobile telephone. The improvement may include a structural deviation in the plane of one or more sides of the SIM card's enclosure. The structural deviation is engageable by an appendage to enable the extraction of the SIM card from the SIM card's socket or from the mobile telephone.

The structural deviation may be embodied as one or more recesses, one or more protrusions, a handle, a roughened surface, or even combination thereof. The handle may include an elastic material connected to the SIM card, for example, by a living hinge. The one or more protrusions, which may be formed by two or more recesses, may not extend beyond the plane of the enclosure of the SIM card, Alternatively, a protrusion may be removably engaged with a recess.

Another embodiment of the present invention is a method of extracting a SIM card from a socket or from a mobile telephone. The method may include the steps of using an appendage to engage a structural deviation in the plane of at least one side of the SIM card's enclosure and applying a force to the engaged structural deviation to cause extraction of the SIM card from the socket or from the mobile telephone.

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. It is intended that the embodiments disclosed herein are illustrative rather than restrictive. The disclosure, however, may better be understood with reference to the following detailed description when read with the accompanying figures, in which.

It will be appreciated that for simplicity and clarity of illustration, elements shown in the figures are not necessarily drawn to scale. Further, where considered appropriate, reference numerals may be repeated among the figures to indicate like, corresponding or analogous elements.

DETAILED DESCRIPTION

The invention summarized above and defined by the claims below will be better understood by referring to the present detailed description of embodiments of the invention. This description is not intended to limit the scope of claims but instead to provide examples of the invention.

The dimensions of ordinary SIM cards are documented in international specifications ISOIEC 7816-1 ("*ISO 7816-1 Smart Card Standard: Part*1: *Physical Characteristics of Integrated Circuit Cards*") and in ENV 1375-1 ("*Identification Card Systems. Intersector Integrated Circuit*(*s*) *Card Additional Formats. Part* 1: *ID*-000 *Card Size and Physical Characteristics*"). ISO/IEC 7816-1 and ENV 1375-1 describe two different SIM card sizes—a full size of approximately credit card size and a "plug-in" SIM card of a smaller size. It is noted, however, that both sizes fall within the scope of the present invention.

Figure 2:
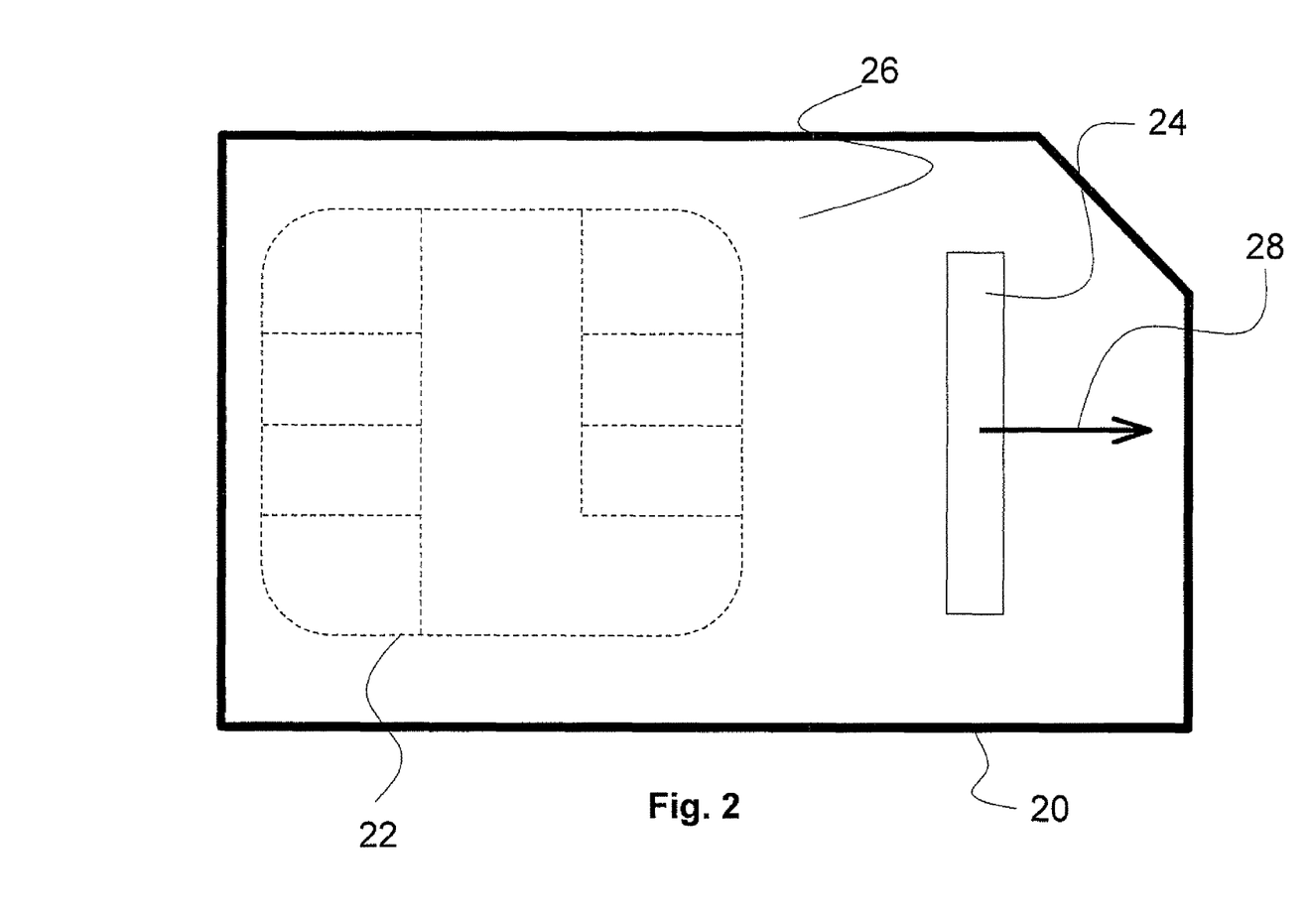
FIG. 2 schematically illustrates a SIM card with a structural deviation in accordance with the present invention.

FIG. 2 depicts an exemplary SIM card 20 with a structural deviation 24 in accordance with the present invention. SIM card 20 includes electronic circuitry (not shown), which resides inside SIM card 20 and an enclosure for housing the electronic circuitry. The enclosure of SIM card 20 also includes external electrical contacts 22 at its surface for transferring signals to and from a SIM card socket (not shown) and the electronic circuitry. In other words, external electrical contacts 22 provide electrical connectivity between the internal electronic circuitry and the external SIM card socket. Electrical contacts 22 are exposed on the side of SIM card opposite to that shown in FIG. 2, so accordingly they are shown with dotted lines.

The plane of at least one side of the enclosure of SIM card 20 includes a structural deviation 24 that is adapted to be engaged by an appendage (not shown in FIG. 2). The presence of the appendage enables a person to extract SIM card 20 from a SIM card socket by applying a force to the enclosure of SIM card 20 through the appendage. In FIG. 2, only upper side 26 is shown, which includes a structural deviation 24.

In the present embodiment, structural deviation 24 is rectangular and located on upper side 26 of SIM card 20. A SIM card may have a structural deviation area with different shapes and different sizes. For example, the structural deviation area may have a relatively small diameter which is yet large enough to contain, for example, a pencil tip with which SIM card 20 may be extracted in extracting direction 28. Structural deviation 24 may be located or formed in different locations on or in different sides of SIM card 20. For example, structural deviation 24 may be located distally, that is, closer to electric contact 22, or proximally. The material of structural deviation 28 may be the same or differ from the material of the enclosure of SIM card 20 in the area that is adjacent structural deviation 28.

Figure 3:
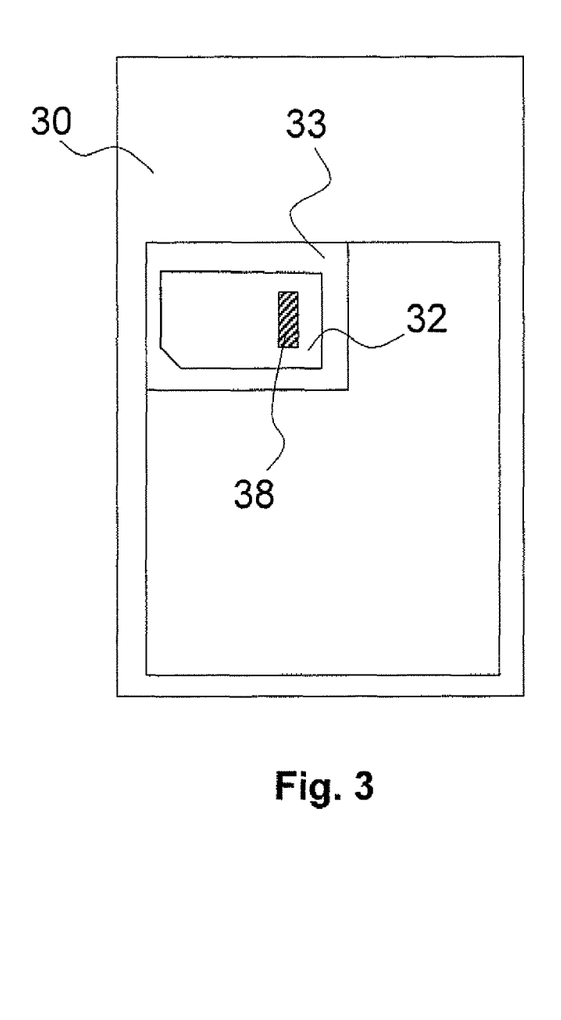
FIG. 3 schematically illustrates a SIM card in accordance with the present invention, which resides within the mobile telephone of FIG. 1.

FIG. 3 schematically illustrates a SIM card 32 in accordance with the present invention. SIM card 32 resides within SIM card socket 33 in mobile phone 30. Structural deviation 38, which is adapted to be engageable by an appendage, facilitates the extraction of SIM card 32 from SIM card socket 33. Socket 33 includes electrical contacts (not shown) against which the electrical contacts (not shown) of SIM card 32 are pressed to enable mobile telephone 30 and the electronic circuitry (not shown), which is embedded within SIM card 32, to exchange electrical signals.

Figure 4A:
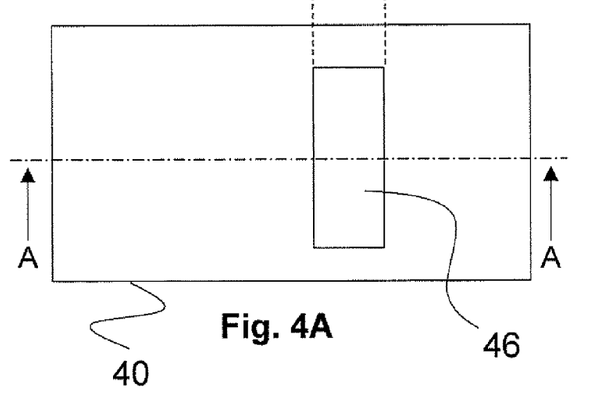
FIGS. 4A and 4B schematically illustrate a structural deviation according to an embodiment of the present invention.
Figure 4B:
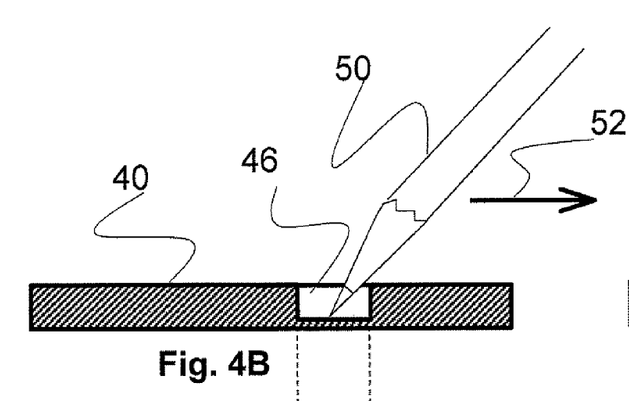

FIGS. 4A and 48 depict an embodiment in which structural deviation 46 is a recess in the body of SIM card 40. Structural deviation 46 may be formed in the body of SIM card 40 using known technologies. For example, recess 46 may be drilled into SIM card 40. Structural deviation 46 may be a small hole that is barely large enough to be engaged by a suitable appendage, such as a pencil or other pointed objects, through which a force may be applied to SIM card 40. Structural deviation 46 may be formed in SIM card 40 during or after its fabrication. In order for a person to extract SIM card 40 from a SIM card socket (not shown), the person may engage structural deviation 46 with pencil 50 to apply a force on SIM card 40 in extraction direction 52 to enable extraction from the SIM card socket.

Figure 5A:
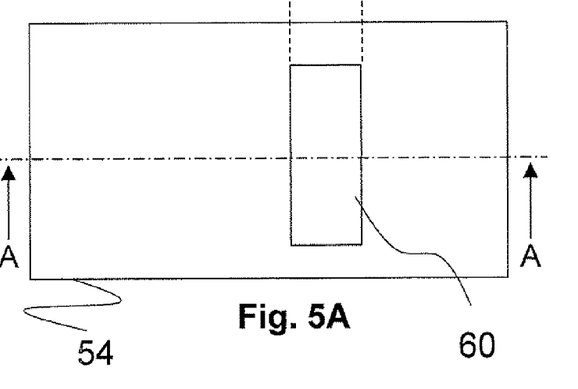
FIGS. 5A and 5B schematically illustrate a structural deviation according to another embodiment of the present invention.
Figure 5B:
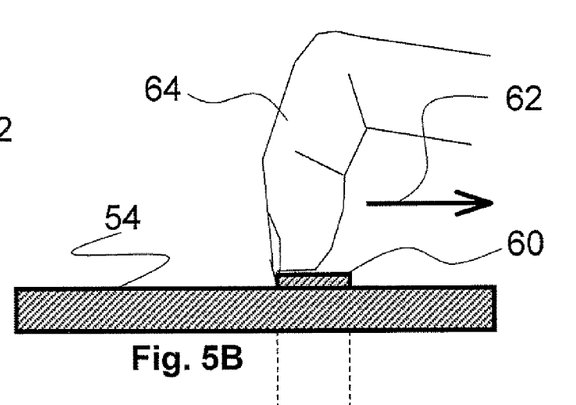

FIGS. 5A and 5B depict an embodiment in which the structural deviation 60 is a protrusion from the plane of the upper side of the enclosure of SIM card 54. Structural deviation 60 may be formed in SIM card 54 using known technologies. For example, structural deviation 60 may be an add-on object that may be fixedly added onto the enclosure of SIM card body 40, for example, by welding or adhering to the enclosure. SIM card 54 may be fabricated with a protrusion identical or similar to structural deviation 60.

To extract SIM card 54 from a SIM card socket (not shown), a user's finger 64, which is an exemplary appendage, applies a force on protrusion 60 in extracting direction 62 to thereby extract SIM card 54 from its socket. The material of structural deviation 60 may be the same as or differ from the material of the enclosure of SIM card 54 that is adjacent structural deviation 60. It is noted that one or more sides of the enclosure of SIM card 54 may include a combination of one or more recesses such as, but not limited to, recess 46 of FIG. 4B, and one or more protrusions such as, but not limited to, protrusion 60 of FIG. 5B.

Figure 6A:
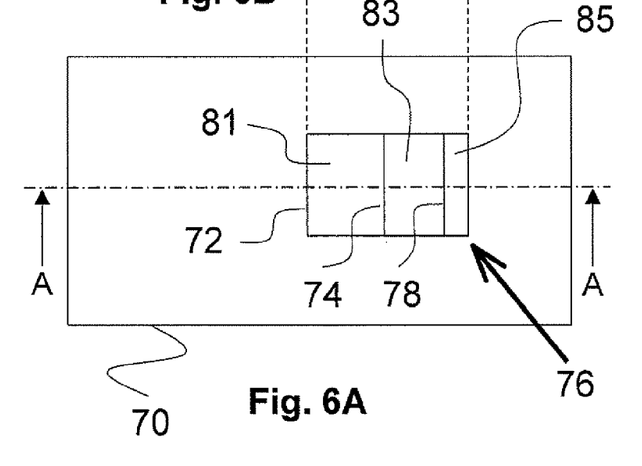
FIGS. 6A and 6B schematically illustrate a structural deviation according to yet another embodiment of the present invention.
Figures 6B, 7B:
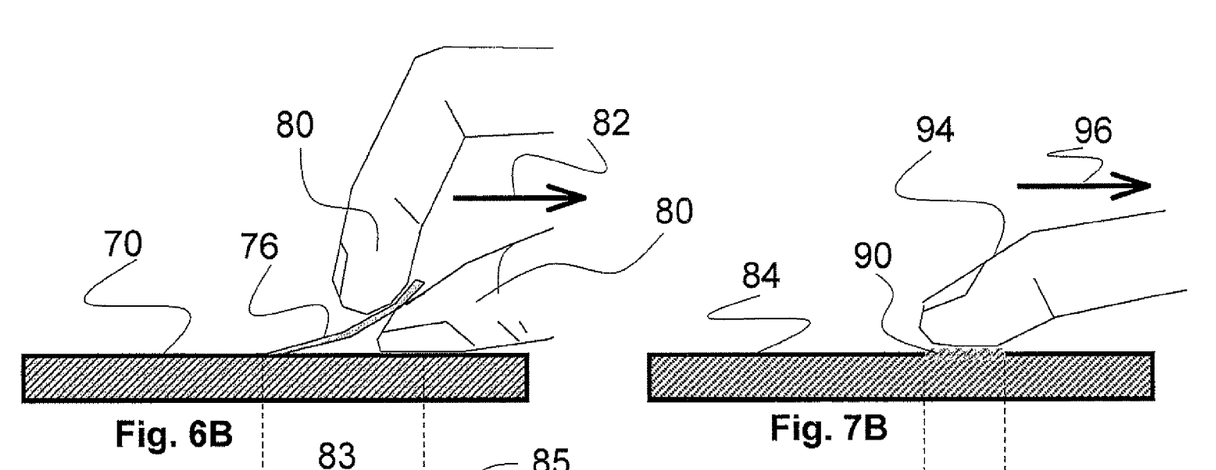
FIGS. 7A and 7B schematically illustrate a structural deviation according to still another embodiment of the present invention.

FIGS. 6A and 6B depict an embodiment in which a structural deviation 76 is elastically extendable out of the plane of the upper side of SIM card 70. By way of example, structural deviation 76 may be an add-on object that may be affixed onto the surface of the enclosure of SIM card 70. Alternatively, structural deviation 76 may be molded or adhered to the body of SIM card 70 or SIM card 70 may be fabricated with structural deviation 76.

Structural deviation 76 may be a one-segment object or it may consist of two or more segments. Each segment of structural deviation 76 may be made from or include one or more materials, such as, but not limited to, plastic, rubber, and metal. Two segments may be elastically joined, such as by an elastomeric hinge or by a living hinge, which may be made from materials including, but not limited to, polypropylene. The term "living hinge" means a hinge with otherwise no moving parts. It is generally a thin section of the material that connects two elements and bends to allow relative movement of these elements about the hinge. Living hinges have many advantages. For example, a living hinge is not susceptible to friction and is less susceptible to wear than most other hinges. Living hinges typically are made from polypropylene due to its excellent fatigue resistance. In one embodiment, structural deviation 76 may be folded into a recess in the body of the SIM card. In another embodiment, a structural deviation 76 may be made as a retractable handle or tab.

Structural deviation 76 is shown including three living hinges 72, 74 and 78 and three segments 81, 83 and 83b Living hinge 72 is an elastic joint connecting structural deviation 76 to the enclosure of SIM card 70 and is herein referred to as the "main living hinge". Living hinge 74 is an elastic joint connecting segment 81 to segment 83. Living hinge 78 is an elastic joint connecting segment 83 to segment 85. Living hinges 72, 74 and 78 are shown in FIG. 6A parallel to one another, although a living hinge may slant relative to other living hinges. Structural deviation 76 may have a different number of segments and segments may have different sizes and shapes. Structural deviation 76 may include a recess to allow better gripping thereof by a person.

To extract SIM card 70 from a SIM card socket or from a mobile telephone, structural deviation 76 has to be displaced about main living hinge 72, pulled out, lifted, extended or unfolded (depending on which variant of structural deviation or living hinge is used) from the enclosure of SIM card 70 to allow the user's fingers 80, which are an exemplary appendage, to grip the proximal edge of structural deviation 76 and to apply a force on SIM card 70 through structural deviation 76 in extracting direction 82.

Figure 7A:
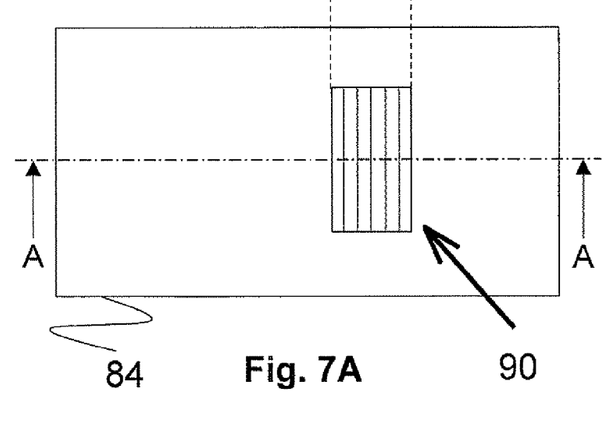

FIGS. 7A and 7B depict an embodiment in which structural deviation 90 is a roughened surface. Structural deviation 90 is or includes a roughened surface that may be corrugated or jagged, and it may be made from or include rubber, plastic metal, or any combination thereof. The material of structural deviation 90 may or include other materials, including, but not limited to, the material from which the enclosure of the SIM card adjacent the structural deviation is made. Structural deviation 90 may be formed in SIM card 84 using known technologies. For example, an add-on object may be fixedly attached to the enclosure of SIM card 84. Alternatively, the enclosure of SIM card 84 may be fabricated with one of its sides or a part thereof roughened. Structural deviation 90 may be provided with different size, shape and roughness characteristics. The area to be roughened may be treated after the SIM card is fabricated, during or as part of the fabrication of SIM card 84.

To extract SIM card 84 from a SIM card socket, a force must be applied to structural deviation 90 by a suitable appendage, such as finger 94, in extracting direction 96 while also pressing structural deviation 90 slightly normal to extracting direction 96. Structural deviation 90 may wholly reside within a recess in the enclosure of SIM card 84 such that structural deviation 90 does not extend beyond the plane of the upper side of the enclosure of SIM card 84. If the space constraints are lenient, structural deviation 90 may be allowed to extend beyond the plane of the enclosure's upper side of the SIM card.

Figure 8A:
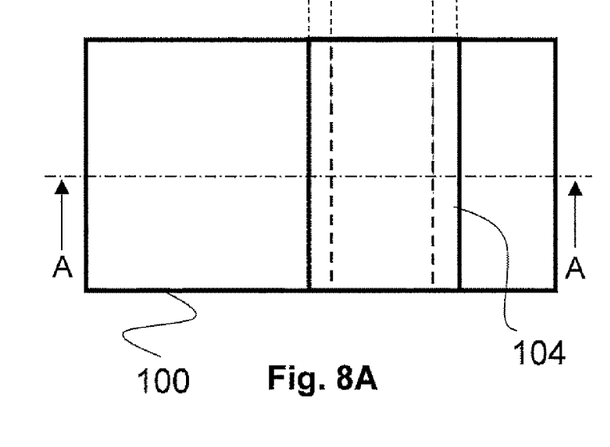
FIGS. 8A and 8B schematically illustrate an exemplary structural deviation according to yet another embodiment of the present invention.
Figure 8B:
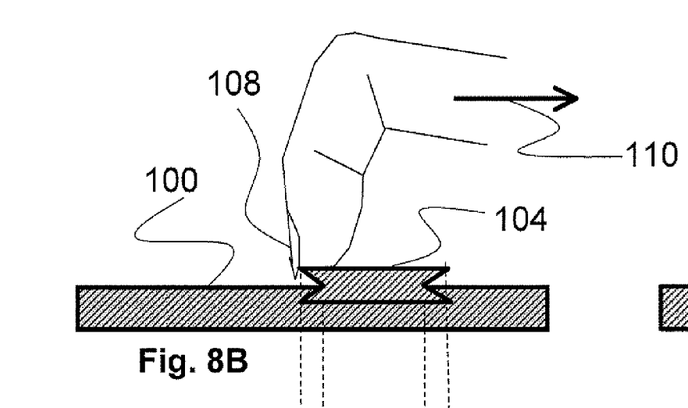

FIGS. 8A and 8B depict an embodiment in which structural deviation 104 is a protrusion or an insert, which is removably engaged with a recess in the enclosure of SIM card 100. The embodiment shown in FIGS. 8A and 8B discloses a recess-protrusion combination that allows a person to use either a recess or protrusion.

To extract SIM card 100 from a SIM card socket, an appendage, such as a user's fingernail 108, can be used to apply a force on SIM card 100 via removable protrusion 104 in extraction direction 110. However, in the absence of removable protrusion 104, fingernail 108 can apply the force on SIM card 100 via the unoccupied recess. The material of structural deviation 104 may the same as or different from the material of the enclosure of SIM card 100 in the area adjacent structural deviation 104.

Figure 9A:
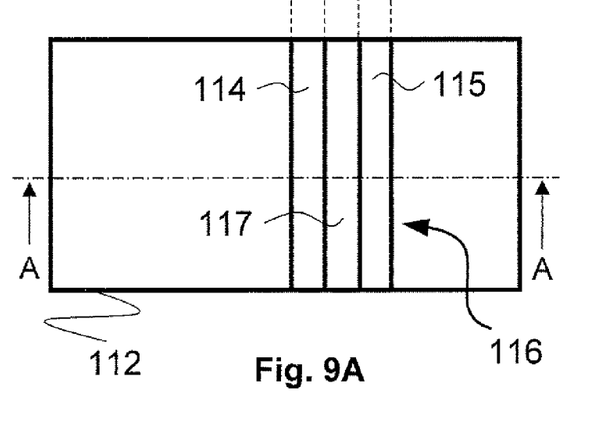
FIGS. 9A and 9B schematically illustrate a structural deviation according to even another embodiment of the present invention.
Figure 9B:
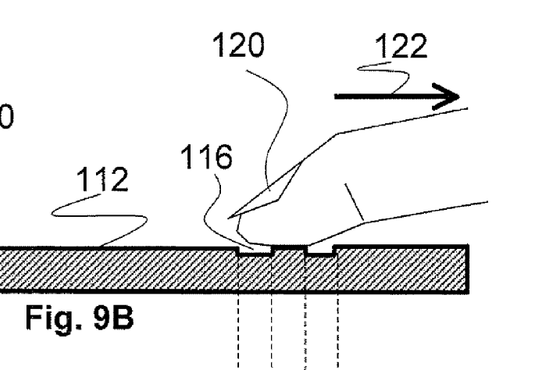

FIGS. 9A and 9B depict an embodiment according to which one or more protrusions can be located between two or more recesses. With reference to FIGS. 9A and 9B, structural deviation 116 is a combination of protrusion 117 located between two recesses 114 and 115. The one or more protrusions may or may not extend beyond the plane of the enclosure of the SIM card. With reference to FIG. 9B, protrusion 117 is shown not extending beyond the plane of the enclosure of SIM card 112 (in this example the upper side of SIM card 112), which makes SIM card 112 suitable for use with SIM card sockets or mobile telephones that cannot accommodate a salient protrusion. In other cases, SIM cards with one or more salient protrusions can be used.

In order to extract SIM card 112 from a socket or from a mobile phone, recess 114 or recess 115 of structural deviation 116 may be engaged by an appendage, for example fingernail 120, to apply or increase a force on SIM card 112 to cause the extraction of SIM card 112 from the socket or from the mobile phone. Alternatively, protrusion 117 may be engaged by a finger's digital pulp (that is, the region of the finger below the fingernail) to apply force to SIM card 112 in extracting direction 122 while the finger's digital pulp depresses protrusion 117 slightly, as demonstrated in FIG. 9B. FIGS. 9A and 9B depict only two recesses 114 and 115 and one protrusion 117 that is located between them. However, the number of recesses and the protrusions located between them may vary. The material of the protrusion 117 may differ from or it may be the same as the material of recess 114 or recess 115.

Another embodiment of the invention is a method of extracting a smart card from a socket or from a mobile telephone. The method is exemplified here with reference to FIG. 5A, although other figures could be referenced instead. The method includes the steps of engaging structural deviation 60 in the plane of a side of the enclosure of SIM card 54 and applying a force to the engaged structural deviation 60, for example, by using finger 64. The smart card or SIM card 54 may have an enclosure complying with the ID-000 format. With reference to FIG. 6A, engaging structural deviation 76 may include rotating a handle or segment 81 about main living hinge 72 and applying a force to structural deviation 76 may include applying a force in extracting direction 82. The force applied in extraction direction 82 may be a shearing force. With reference to FIG. 8B, prior to engaging a structural deviation, a recess in the enclosure of SIM card 100 may be removably engaged with insert 104 to provide a protrusion from the plane of the upper side of the enclosure of SIM card 100.

Having thus described exemplary embodiments of the invention, it will be apparent to those skilled in the art that modifications of the disclosed embodiments will be within the scope of the invention. For example, although the smart card structural deviations discussed above include recesses, protrusions, and handles, the invention may alternatively be embodied with any other equivalent means for engaging an appendage to enable extraction of the smart card from its socket.

Additional alternations, modifications, and improvements of the disclosed invention, though not expressly described above, are nonetheless intended and implied to be within spirit and scope of the invention. Accordingly, the foregoing discussion is intended to be illustrative only; the invention is limited and defined only by the following claims and equivalents thereto.

I claim:

1. A smart card adapted for insertion into a smart card socket, the smart card comprising:
   a) electronic circuitry; and
   b) an enclosure housing said electronic circuitry, said enclosure having a major surface aligned with a plane, said enclosure having a structural deviation in the major surface,
   wherein said structural deviation is engageable by an appendage to enable extraction of the smart card from the smart card socket, said structural deviation is extendable out of the plane that is aligned with said major surface of said enclosure while remaining fixedly attached to said major surface to enable extraction of the smart card from the smart card socket.

2. The smart card according to claim 1, wherein said structural deviation includes at least one living hinge.

3. The smart card according to claim 1, wherein said structural deviation has a roughened surface.

4. The smart card according to claim 1, wherein the material of said structural deviation differs from the material of said enclosure adjacent said structural deviation.

5. The smart card according to claim 1, wherein the material of said structural deviation is the same as the material of said enclosure adjacent said structural deviation.

6. A smart card adapted for insertion into a smart card socket, the smart card comprising:
   a) electronic circuitry; and
   b) an enclosure housing said electronic circuitry, said enclosure having a major surface aligned with a plane, said major surface having a recess,
   wherein the major surface of said enclosure has a means for engaging an appendage to enable extraction of the smart card from the smart card socket, said means fits into said recess when not in use and is retractable from said recess while remaining fixedly attached to said major surface to enable extraction of the smart card from the smart card socket.

7. A SIM card having multiple sides, a first of the sides is a major surface aligned with a plane, the SIM card being extractable from a SIM card socket in response to a force applied in an extracting direction, wherein the improvement comprises:
   a structural deviation in the major surface, said structural deviation being engageable by an appendage to enable extraction of the SIM card from the SIM card socket, said structural deviation includes a recess in the major surface and a removable object, said removable object fits within the recess and protrudes above the plane of the first side to allow the appendage to engage said removable object above the plane of the first side to enable extraction of the SIM card from the SIM card socket, said removable object is completely removable from said SIM card to allow the appendage to engage said recess to enable extraction of the SIM card from the SIM card socket.

8. The SIM card according to claim 7, wherein said structural deviation has a roughened surface.

9. The SIM card according to claim 7, wherein the material of said structural deviation differs from the material of the region adjacent said structural deviation.

10. The SIM card according to claim 7, wherein the material of said structural deviation is the same as the material of the region adjacent said structural deviation.

11. The SIM card according to claim 7, wherein said SIM card is a high-capacity storage subscriber identification module (SIM) card.

12. The smart card according to claim 1, wherein said structural deviation is a retractable tab.

13. The smart card according to claim 1, wherein said structural deviation is a retractable handle.

14. The smart card according to claim 1, wherein said structural deviation folds into a recess in said major surface.

15. The smart card according to claim 1, wherein said structural deviation includes multiple segments that are separated by elastic joints.

16. The smart card according to claim 1, wherein said enclosure complies with ID-000 format.

17. The smart card according to claim 1, wherein said structural deviation is elastically extendable out of the plane of said major surface while remaining fixedly attached to said major surface to enable extraction of the smart card from the smart card socket.

18. The smart card according to claim 6, wherein said means folds into said recess when not in use.

19. The smart card according to claim 6, wherein said enclosure complies with ID-000 format.

20. A smart card comprising:
   electronic circuitry;
   an enclosure housing the electronic circuitry, the enclosure having a top side and a bottom side, the top side has a major surface that is aligned with a plane, the enclosure has an element that is extendable out of the major surface of the top side while remaining fixedly attached to the major surface, the element is engageable by an appendage to enable extraction of the smart card from a smart card socket; and
   electrical contacts that are exposed on the bottom side of the enclosure, the electrical contacts are electrically coupled to the electronic circuitry.

21. The smart card of claim 20, wherein the element is elastically extendable out of the major surface while remaining fixedly attached to the major surface.

22. The smart card of claim 20, wherein the major surface has a recess, the element fits into the recess and is retractable from the recess while remaining fixedly attached to the major surface to enable extraction of the smart card from a smart card socket.

23. The smart card of claim 22, wherein the element folds into the recess.

24. A smart card comprising:
   electronic circuitry;
   an enclosure housing the electronic circuitry, the enclosure having a top side and a bottom side, the top side has a major surface that is aligned with a plane, the enclosure has an element that is extendable out of the major surface of the top side while remaining fixedly attached to the major surface, the major surface has a recess, the element fits into the recess and is retractable from the recess while remaining fixedly attached to the major surface to enable extraction of the smart card from a smart card socket; and electrical contacts that are exposed on the bottom side of the enclosure, the electrical contacts are electrically coupled to the electronic circuitry.

25. The smart card of claim 24, wherein the element folds into the recess.

26. A method for providing a smart card adapted for insertion into a smart card socket, the method comprising:
 a) providing electronic circuitry; and
 b) providing an enclosure housing said electronic circuitry, said enclosure having a major surface aligned with a plane, said providing an enclosure includes providing a structural deviation in the major surface,
 wherein said structural deviation is engageable by an appendage to enable extraction of the smart card from the smart card socket, said structural deviation is extendable out of the plane that is aligned with said major surface of said enclosure while remaining fixedly attached to said major surface to enable extraction of the smart card from the smart card socket.

27. The method according to claim 26, wherein said providing said structural deviation includes affixing said structural deviation to said major surface.

28. The method according to claim 26, wherein said providing said structural deviation includes molding said structural deviation to said enclosure.

29. The method according to claim 26, wherein said providing said structural deviation includes fabricating said enclosure with said structural deviation.

30. The method of claim 26, wherein said providing said structural deviation includes adhering the structural deviation to said enclosure.

31. The method of claim 26, wherein said structural deviation folds into a recess in said major surface.

32. A method comprising:
 providing a SIM card having multiple sides, a first of the sides is a major surface aligned with a plane, the SIM card being extractable from a SIM card socket in response to a force applied in an extracting direction; and
 providing a structural deviation in the major surface, said structural deviation being engageable by an appendage to enable extraction of the SIM card from the SIM card socket, said structural deviation includes a recess in the major surface and a removable object, said removable object fits within the recess and protrudes above the plane of the first side to allow the appendage to engage said removable object above the plane of the first side to enable extraction of the SIM card from the SIM card socket, said removable object is completely removable from said SIM card to allow the appendage to engage said recess to enable extraction of the SIM card from the SIM card socket.

33. The method according to claim 32, wherein said structural deviation has a roughened surface.

* * * * *